(12) United States Patent
Baghdasarian

(10) Patent No.: US 9,708,082 B2
(45) Date of Patent: *Jul. 18, 2017

(54) RADIAL RELEASE DEVICE

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/012,915

(22) Filed: Aug. 28, 2013

(65) Prior Publication Data

US 2014/0016992 A1    Jan. 16, 2014

Related U.S. Application Data

(63) Continuation of application No. 12/082,818, filed on Apr. 14, 2008, now Pat. No. 8,568,053.

(51) Int. Cl.
| | | |
|---|---|---|
| *B64G 1/64* | (2006.01) | |
| *B64G 1/22* | (2006.01) | |
| *B64G 1/44* | (2006.01) | |
| *B64G 1/66* | (2006.01) | |
| *F16B 21/16* | (2006.01) | |

(52) U.S. Cl.
CPC .............. *B64G 1/645* (2013.01); *B64G 1/222* (2013.01); *B64G 1/44* (2013.01); *B64G 1/66* (2013.01); *F16B 21/16* (2013.01); *Y10T 74/11* (2015.01); *Y10T 403/11* (2015.01); *Y10T 403/16* (2015.01); *Y10T 403/32114* (2015.01); *Y10T 403/443* (2015.01)

(58) Field of Classification Search
CPC .......... B64G 1/222; B64G 1/64; B64G 1/645; B64G 1/44; B64G 1/66; F16B 21/16; Y10T 403/05; Y10T 74/11; G05G 17/00
See application file for complete search history.

(56) References Cited

U.S. PATENT DOCUMENTS 1,337,642 A    4/1920   Clark
4,638,608 A    1/1987   Coy
(Continued)

FOREIGN PATENT DOCUMENTS

WO    WO 2005098245 A1 * 10/2005    ............ F16B 1/0014

OTHER PUBLICATIONS

Tape: definition of tape in Oxford dictionary. Definition [online]. Oxford Dictionary, 2016 [retrieved on Mar. 21, 2016]. Retrieved from the Internet: <URL: http://www.oxforddictionaries.com/us/definition/american_english/tape>.*

(Continued)

*Primary Examiner* — Matthieu F Setliff
(74) *Attorney, Agent, or Firm* — Weaver Austin Villeneuve & Sampson LLP

(57) ABSTRACT

A release device having a multi-segment split spool with a central bore adapted to axially restrain a tensioned member. A tensioned tape is overlappingly wound around the spool segments thereby preventing radial movement of the spool segments. The overlapping winding allows for a low profile housing for the-release device. The multiple segments require less radial motion for release of the tensioned member.

12 Claims, 11 Drawing Sheets

(56) References Cited

U.S. PATENT DOCUMENTS

| | | | |
|---|---|---|---|
| 5,282,709 A | 2/1994 | Chaput et al. | |
| 5,471,888 A | 12/1995 | McCormick | |
| 5,716,157 A | 2/1998 | Kester | |
| 6,073,914 A | 6/2000 | Roth et al. | |
| 6,133,818 A | 10/2000 | Baghdasarian et al. | |
| 6,249,063 B1 | 6/2001 | Rudoy et al. | |
| 6,433,990 B1 | 8/2002 | Rudoy et al. | |
| 6,525,920 B2 | 2/2003 | Rudoy et al. | |
| 6,747,541 B1 | 6/2004 | Holt et al. | |
| 8,021,069 B2* | 9/2011 | Baghdasarian | 403/2 |
| 8,568,053 B2* | 10/2013 | Baghdasarian | 403/2 |
| 2003/0076215 A1 | 4/2003 | Baghdasarian | |
| 2010/0089189 A1 | 4/2010 | Rudoy et al. | |

OTHER PUBLICATIONS

Strip Definition of Strip by Merriam-Webster. Definition [online]. Merriam-Webster, 2016 [retrieved on Sep. 21, 2016]. Retrieved from the Internet: <URL: http://www.merriam-webster.com/dictionary/strip>.*

U.S. Office Action dated Oct. 19, 2010 issued in U.S. Appl. No. 12/215,041.

U.S. Notice of Allowance dated May 18, 2011 issued in U.S. Appl. No. 12/215,041.

U.S. Office Action dated Jul. 8, 2011 issued in U.S. Appl. No. 12/082,818.

U.S. Final Office Action dated Dec. 19, 2011 issued in U.S. Appl. No. 12/082,818.

U.S. Final Office Action dated Jun. 14, 2012 issued in U.S. Appl. No. 12/082,818.

U.S. Final Office Action dated Feb. 12, 2013 issued in U.S. Appl. No. 12/082,818.

U.S. Office Action dated Aug. 2, 2013 issued in U.S. Appl. No. 12/082,818.

U.S. Notice of Allowance dated Aug. 19, 2013 issued in U.S. Appl. No. 12/082,818.

\* cited by examiner

US 9,708,082 B2

RADIAL RELEASE DEVICE

CROSS REFERENCES TO RELATED APPLICATIONS

This application is a continuation of, and claims priority to, U.S. patent application Ser. No. 12/082,818, filed Apr. 14, 2008, now U.S. Pat. No. 8,568,053, which is hereby incorporated by reference herein in its entirety for all purposes.

BACKGROUND

1. Field of the Invention

The present invention relates to a release device which may to release such items as antennas, solar arrays, positioning mechanisms, and other devices.

2. Description of Related Art

A release apparatus, such as a separation spool device, is used to release a captured member which constrains the deployment of a spacecraft element, such as a solar array and/or reflectors, in the stowed position. In many prior art devices, the spacecraft element was restrained with a wire or a holddown rod system which was released using a pyrotechnic device. Typically, the pyrotechnic device would fire a blade against a base, with the wire or rod to be cut and released. Although useful in many applications, these devices imparted high shock loads into the units which they were to release, as well as the spacecraft itself.

A design that avoided the shocks associated with pyrotechnic release devices was the separation spool device, which used a fused element to release a captured member. U.S. Pat. No. 6,133,818, to Baghdasarian, discusses a release apparatus wherein two piece split spool with an annulus is used to capture a capture member larger in diameter than the annulus of the spool. The two pieces of the split spool are held together with a wire that is wrapped around the spool. A drawback of this design is that the wire, wrapped under tension around the outside of the spool, may have unpredictable dynamics in some cases when released. In some cases, there may be risk of the wire fouling upon itself when released, which may prevent the spool from spreading far enough apart to allow the captured member to pass through, and thus this may prevent the release device from releasing the stowed spacecraft element. Another drawback of this design is that a two piece spool design presents a geometry that requires significant radial movement of the spool pieces to affect the release.

Further, a two segment spool has geometric limitations as far as load carrying capacity and a phenomenon referred to as "Friction lock up" condition, a failure to release condition due to friction between the spool-to-captured member interface, and the fact that spherical (ball) end of the captured member leaves the segments contacting the two extreme points of each segment. These two points are almost 180 degrees apart for a 2-segment spool. A ball end could easily be prevented from release with very little friction between the ball and the spool interface.

SUMMARY

A release device having a multi-segment split spool with a central bore adapted to axially restrain a tensioned member. A tensioned tape is overlappingly wound around the spool segments thereby preventing radial movement of the spool segments. The overlapping winding allows for a low-profile housing for the release device. Overlapping design of flat tape provides predictable unwinding dynamics upon release.

The multiple segments require less radial motion for release of the tensioned member. Further, multiple segments spool reduces the potential of "Friction lock up" due to smaller contact angle between each segment with the captured member (almost 90 for 4-segment, almost 60 for a 6-segment, and almost 45 for a 8-segment spool).

DETAILED DESCRIPTION

Figure 1A:
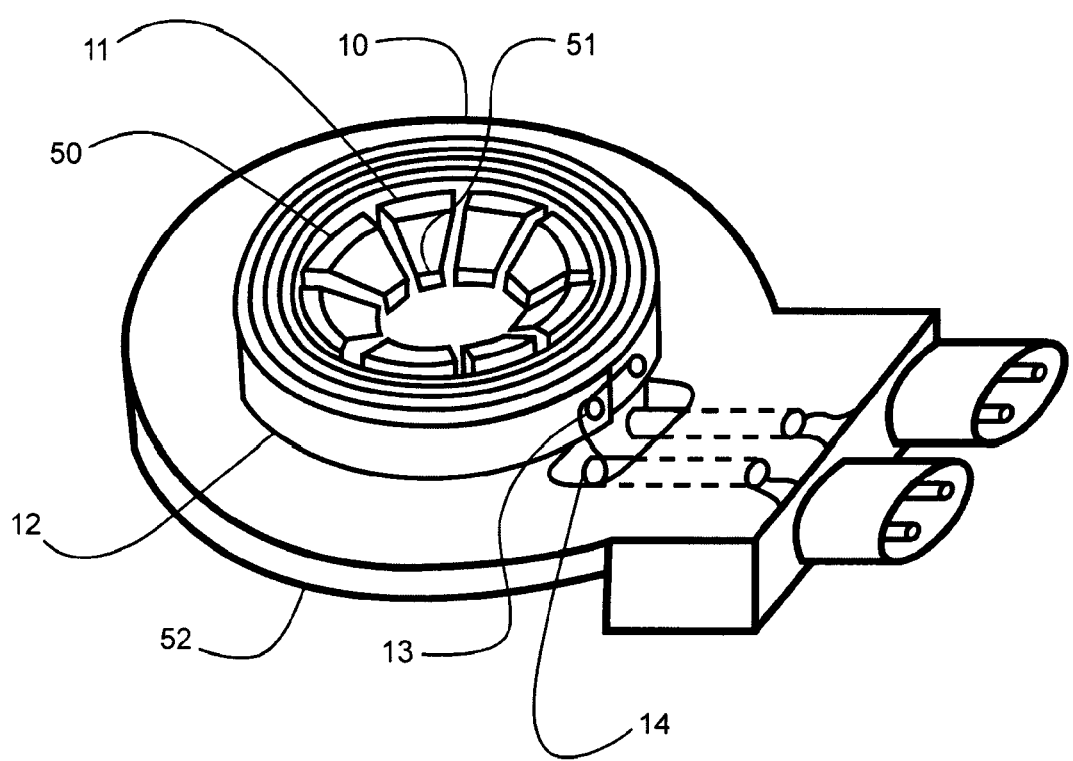
FIG. 1A is a perspective view of portions of a release device according to some embodiments of the present invention.
Figure 1B:
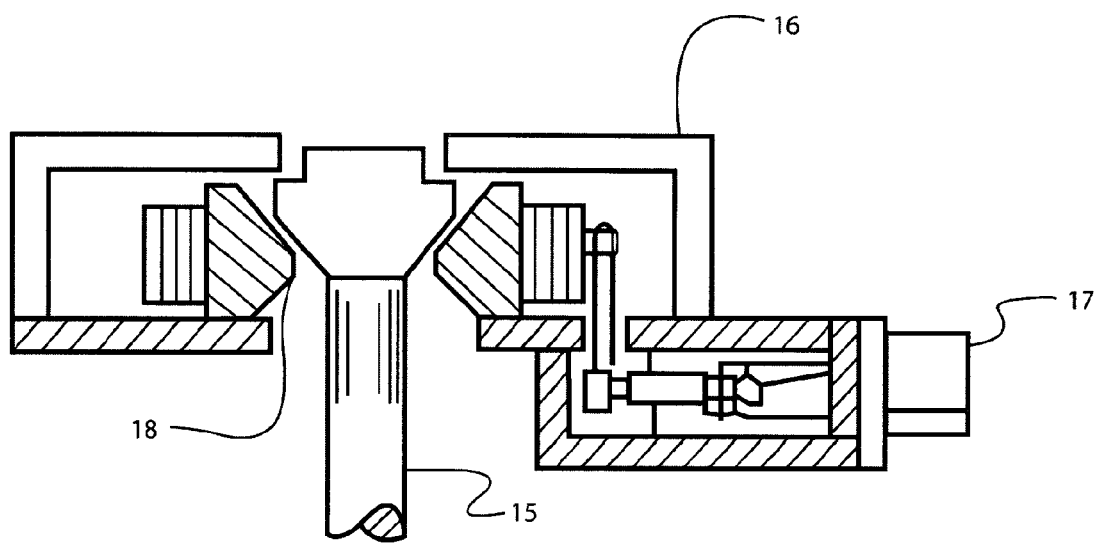
FIG. 1B is a cutaway side view of a release device according to some embodiments of the present invention.

In some embodiments of the present invention, as seen in FIGS. 1A-B, a release apparatus 10 for controlling the deployment of a desired device by releasing a captured member 15 utilizes a multi-piece split spool 11 adapted to restrain the captured member 15. The multi-piece spool 11 consists of three or more segments 50 which define a central bore 51 adapted to restrain a captured member 15. In some embodiments, the spool 11 consists of six segments. In some embodiments, the spool consists of eight segments. As seen in cross-section in FIG. 1A, the segments of the spool are adapted to fittingly receive and axially restrain an expanded portion 18 of the captured member 15 when the segments 50 are constrained together as a unit. The internal area of the spool 11 in the interface area of the spool 11 with the expanded portion 18 of the captured member 15 may be conical in some embodiments. In some embodiments, the internal area of the spool 11 in this region may be a cone or a partial cylinder (or a curved surface other than a cone) with an angle of 30 degrees off of the vertical axis of bore. In some embodiments, the external profile of the expanded portion 18 of the captured member 15 may also be conical. In some embodiments, the interface area may have a curved profile. In some embodiments, the internal area of the spool may be lubricated with a dry lubricant such as molybdenum disulfide.

A tensioned tape 12 is wrapped around the external periphery of the spool 11. The tape 12 is adapted to constrain the segment 50 of the spool 11 together. A first end of the tape 12 may be removably fastened to one of the segments 50 of the spool 11. The fastening of the tape 12 to one of the segments provides tangential restraint such that the tape may be wound under tension around the outer periphery of the spool, and also will prevent the slipping of the tape around the spool once this tension has been placed in the tape. In some embodiments, the tape 12 may be a spring tempered stainless steel which is 0.2 inches wide and 0.005 inches thick. Once wound under tension, the second end 13 of the tape 12 may be secured under tension by a fuse wire locking device 14 or other restraint and release system.

Securing the second end 13 of the tape may be done to itself or to an external support, not shown in this embodiment.

Segments 50 of spool 11 may be prevented from rotation by use of anti-rotation pins between each segment, or by other means.

Figure 2:
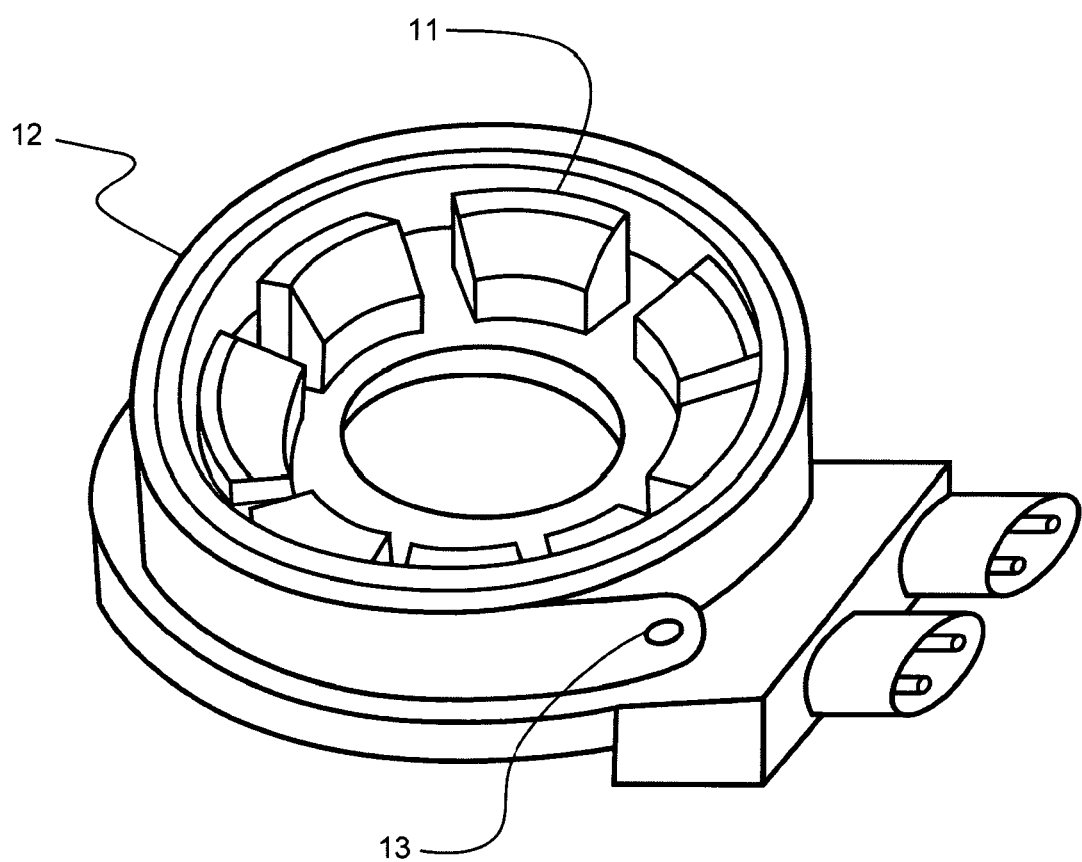
FIG. 2 is a perspective view of portions of a release device according to some embodiments of the present invention.
Figure 3A:
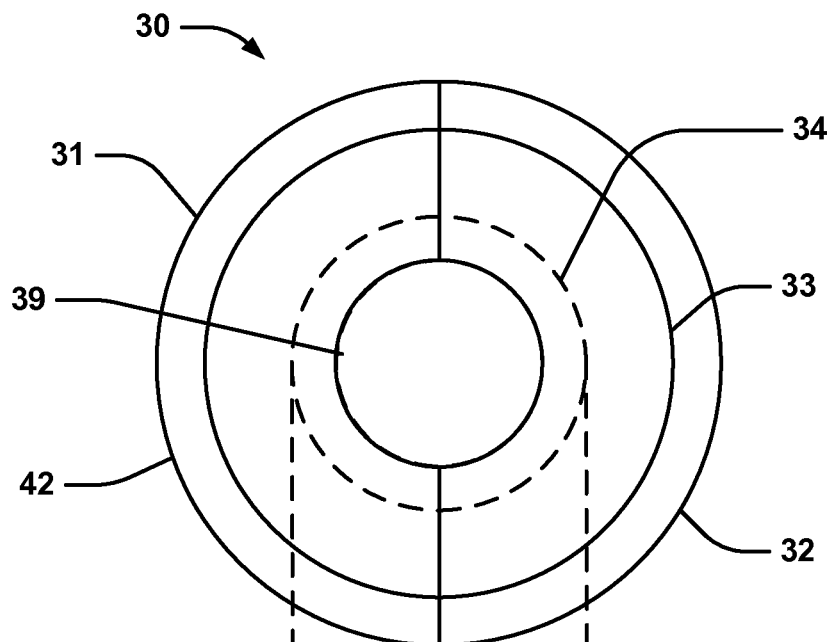
FIGS. 3A-B are views of a two piece spool.
Figure 3B:
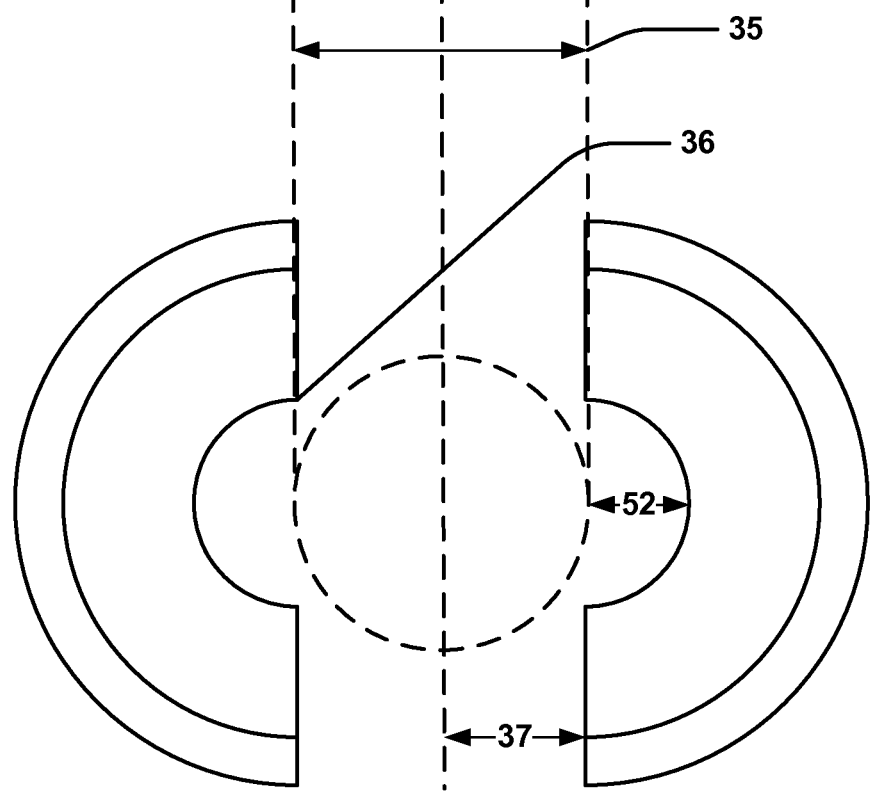

In some embodiments, the tape 12 is wound with its successive layers over each other in plane. This allows for a much more compact overall design, in the direction of the axis of the spool, of the release device compared to previous designs. Thus, the height of the housing 16 may be kept to a minimum. FIG. 2 illustrates the release apparatus with the tape 12 in relaxed, unwound position. This position is reached after the release of the second end 13 of the tape 12. Typically, the captured member 15 is under tension axially. Thus, with the release of the second end 13 of the tape 12 and the removal of the constraint on outward motion of the spool segments, the axial pull by the captured member forces the segments of the spool outward in a radial direction. The tape 12 has remained in plane and has released and unwound in an orderly fashion. The segments of the spool 11 are seen in a position further from the center axis of the constrained spool.

Another advantage of the overlaying tape is that the tape layers have friction between them, and thus the tension on the tape is reduced in the radially outward direction with each successive wrap. The tension, therefore, on the release mechanism may be significantly lower than the tension at the center of the tape. Thus, a release device, such as a fuse, with a low load capability may be used to release the tape.

FIGS. 3A-B and 4A-B illustrate a contrast between a two segment spool system 30 and a multi-piece spool system 40. The two segment system 30 consists of two segments 31, 32 which define a central bore 39. An interface surface 33 is adapted to interface with the expanded portion of a restrained member and to restrain its axial motion. The restrained member will typically be placed under tension. The tension along the axis of the bore of the spool will result in both axial and radial loading of the spool segments due to the conical profile of the interface surface 33 of the spool segments 31, 32. The radial loading of the spool segments will be initially be countered by the wound tape as described above. Upon release of tension in the tape, there will no longer be a constraint on radial motion of the spool segments other than the friction of the bases of the spool segments against the adjacent surfaces. As will be discussed later, friction between surface 33 and expanded portion of the restrained member (typically a spherical surface) will have an effect on separation of spool segments.

The spool segments must move a distance 37 sufficient to allow for the outer diameter 34 of the expanded portion of the restrained member to pass through the bore in the axial direction. As the two segments 31, 32 begin to separate, the axial force, which in turn drives the separation of the segments, becomes concentrated on the corners 36 of the segments. With just two segments, the force may be concentrated on just four points. With more force concentrated on each point, the possibility of galling and sticking at a single point, with a resulting failure to release the restrained member, is enhanced. In addition, the distance 37 that the segments must move is at a maximum.

Figure 4A:
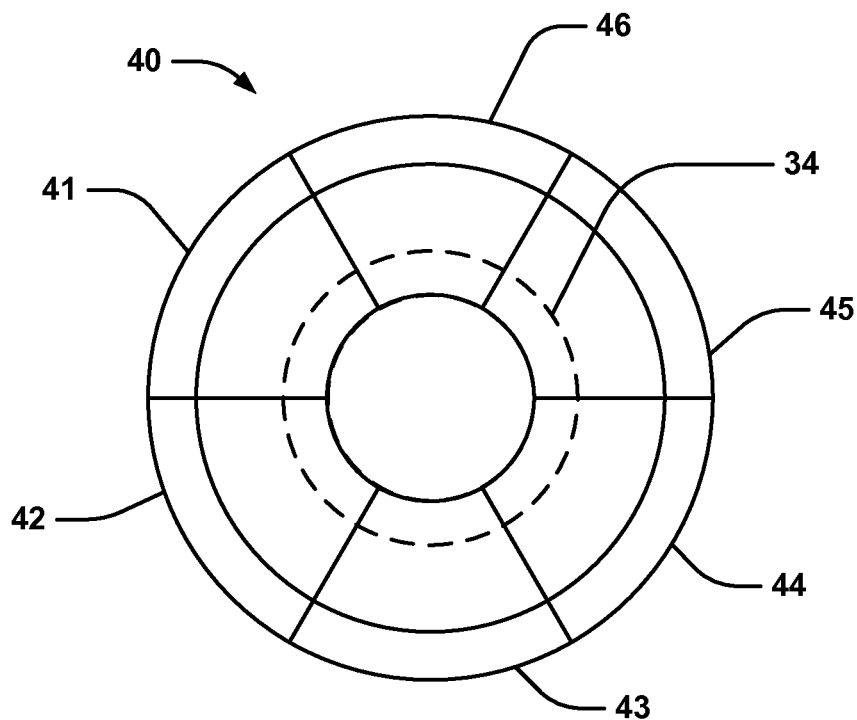
FIGS. 4A-B are views of a six piece spool according to some embodiments of the present invention.
Figure 4B:
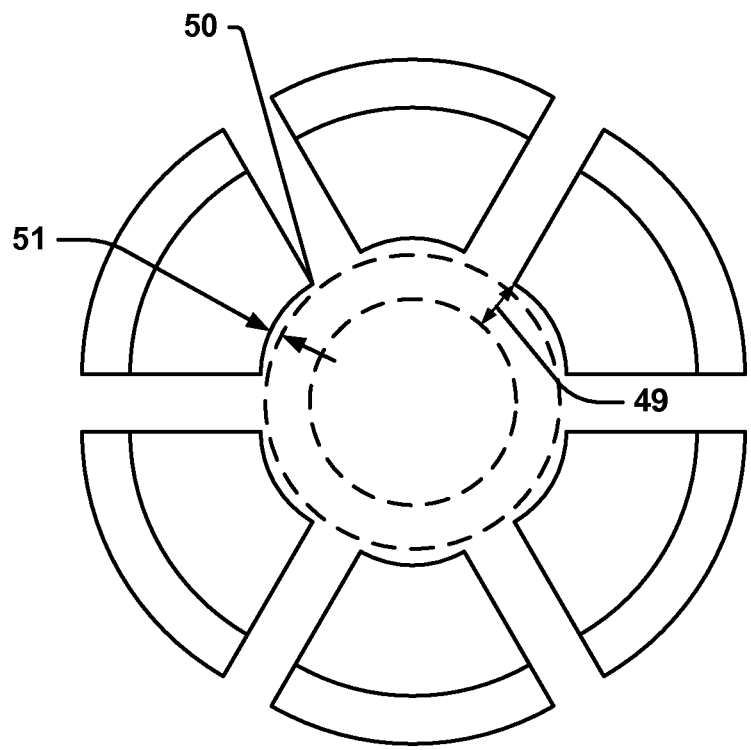

Referring now to FIGS. 4A-B, a six piece spool system 40 consists of six spool segments 41, 42, 43, 44, 45, 46. Thus, the interface surface 47 is broken into six separate pieces. The spool segments must move a distance 49 sufficient to allow for the outer diameter 34 of the expanded portion of the restrained member to pass through the bore in the axial direction. As the segments 41, 42, 43, 44, 45, 46 begin to separate, the axial force, which in turn drives the separation of the segments, will be spread across the segments. The distance 49 that the segments 41, 42, 43, 44, 45, 46 must travel in order to allow the passage of the expanded portion of the restrained member is significantly less than with a two segment spool. The differential offset 51 in between the depth of the segment bore and the diameter of the expanded portion of the restrained member in the multi-piece spool system is significantly smaller than the differential offset 52 in the two piece spool system. This gives the multi-piece spool the distinct advantage of requiring less radial travel distance for each segment in order to release the captured member. The use of a full circumferential spool reduces the contact forces in the interface area of the spool segments and the expanded portion of the restrained member.

Figure 5A:
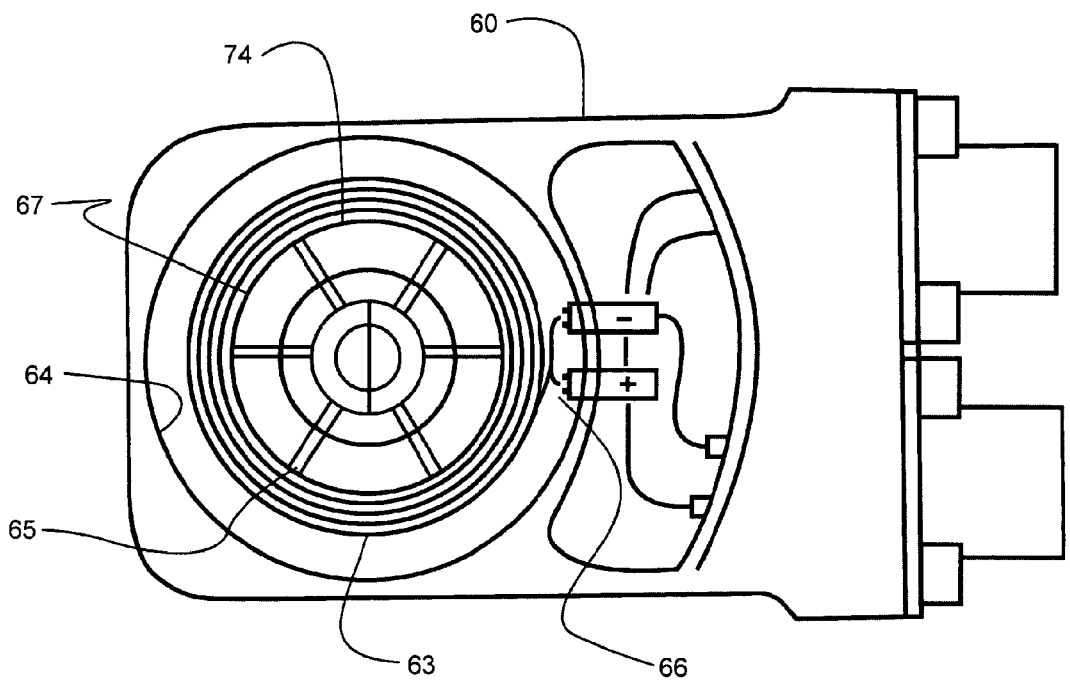
FIG. 5A is a top view of portions of a release device according to some embodiments of the present invention.
Figure 5B:
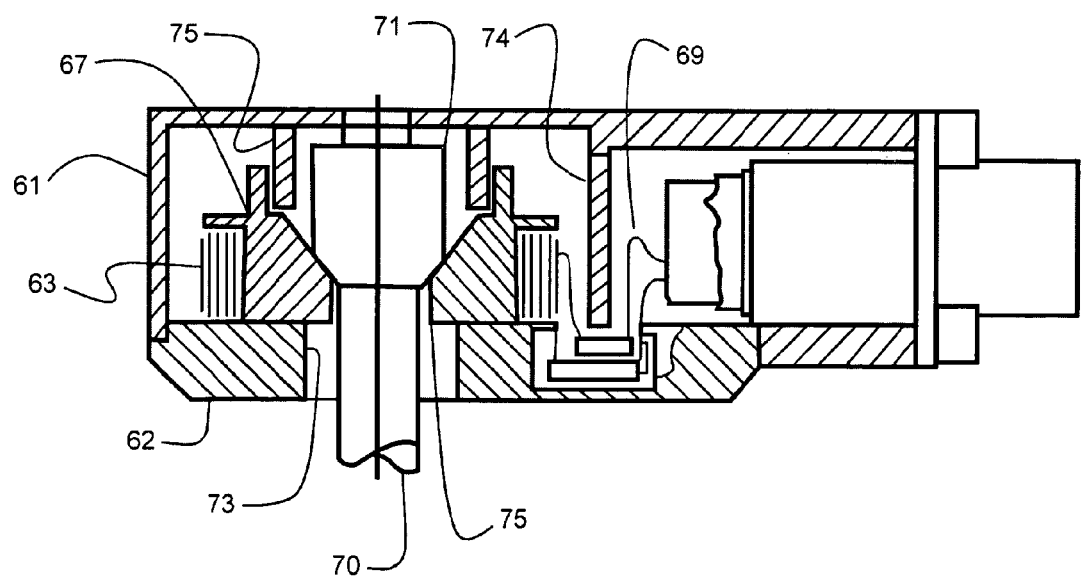
FIG. 5B is a cutaway view of portions of a release device according to some embodiments of the present invention.

FIGS. 5A-B illustrate a release system according to some embodiments of the present invention. A release apparatus 60 may control the deployment of a selected device by releasing a captured member 70. A multi-piece split spool 67 consists of six segments 74 which define a central bore 75. The central bore 75 is sized such that the expanded portion 71 of the captured member 70 is constrained from downward axial motion by the interface portion of the segments 74 of the spool 67.

The segments 74 of the spool 67 are constrained from motion in the external radial direction by a wound restraining tape 63. A first end 65 of the tape 63 may be constrained from motion along the exterior of the spool by attachment to one of the segments of the spool. A second end of the tape 66 may be constrained by a fuse wire release device 69 or other means. The housing 61 is low profile due to the use of an overlapping tape as the spool restraint. The housing 61 may include a wall 74 adapted to separate the spool and tape from the electrical interface portion 68 of the system. The housing 61 may have a circular inner profile 64 adapted to reduce the likelihood that the tape, as it unwinds and expands radially during the release cycle, will hang up on any inner surfaces. Vertical members 76 may be in place to further separate the inner compartment.

The base 62 is of sufficient strength that it may withstand the axial force of the captured member. The base 62 may also provide the sliding surface upon which the spool segments move upon release of the tension in the tape. The base bore 73 is sized such that the expanded portion 71 of the captured member 70 may pass through the base bore upon release. The captured member 70 may be a rod with a threaded interface for connection into a larger system. As seen in FIG. 5B, the surface 77 upon which the spool segments slide in this embodiment is a flat surface, as are the bottoms of the spool segments. The sliding surface and the bottoms of the spool segments may have different geometries is other embodiments.

Figure 6:
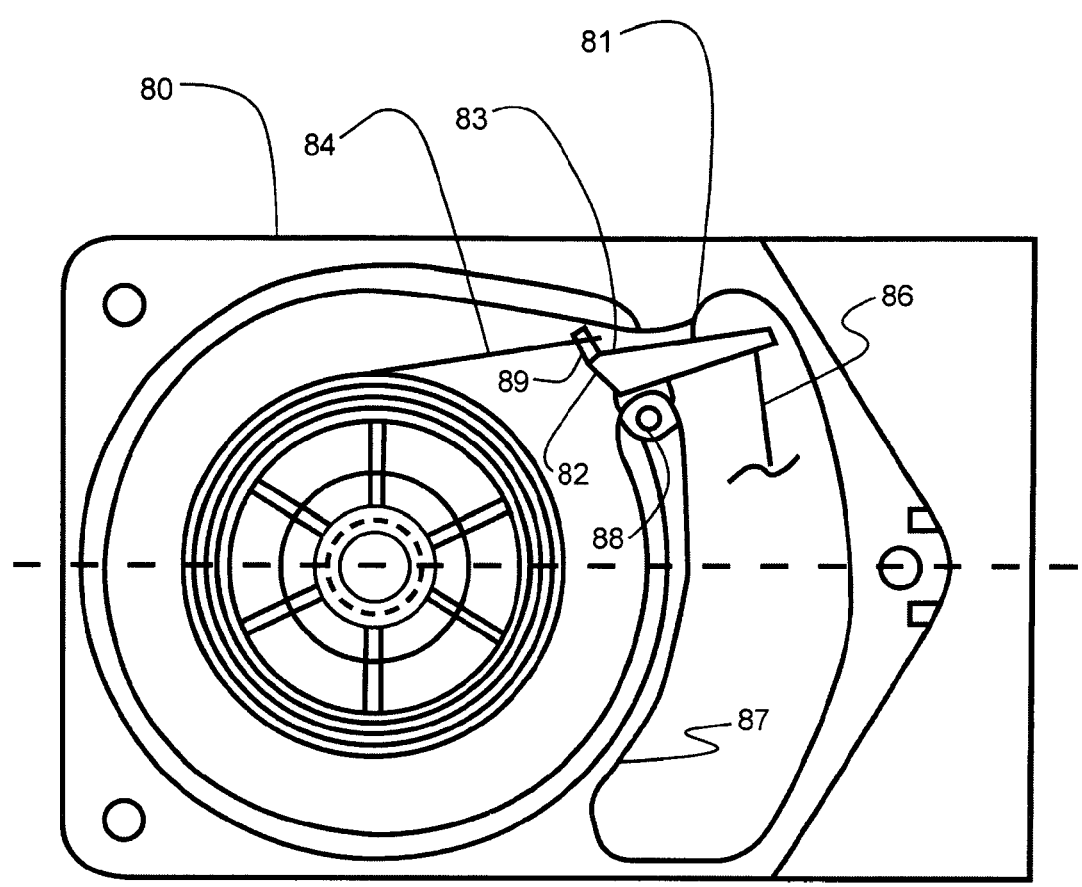
FIG. 6 is a top view of portions of a release device according to some embodiments of the present invention.

FIG. 6 illustrates a release device 80 according to some embodiments of the present invention. A tape release lever 82 is mounted within the housing and rotates around a pin 88. A first end 83 of the tape release lever 82 includes a tab 89 adapted to hold the wound tape 84 under tension. The tab 89 may be inserted into a hole in the tape. The tape release lever 82 is adapted to hold the tape using the tab when the lever is in a first position, and to release the tape as the lever rotates to a second position. A second end 81 of the tape release lever 82 is adapted to be constrained by a fuse wire release system 86, which may be separated from the tape and spool by an interior wall 87. The second end 81 of the tape release lever 82 may be significantly longer than the first end 83 to allow for the tension of the tape to be held with a lower force due to the longer lever arm of the second end 81.

Figure 7A:
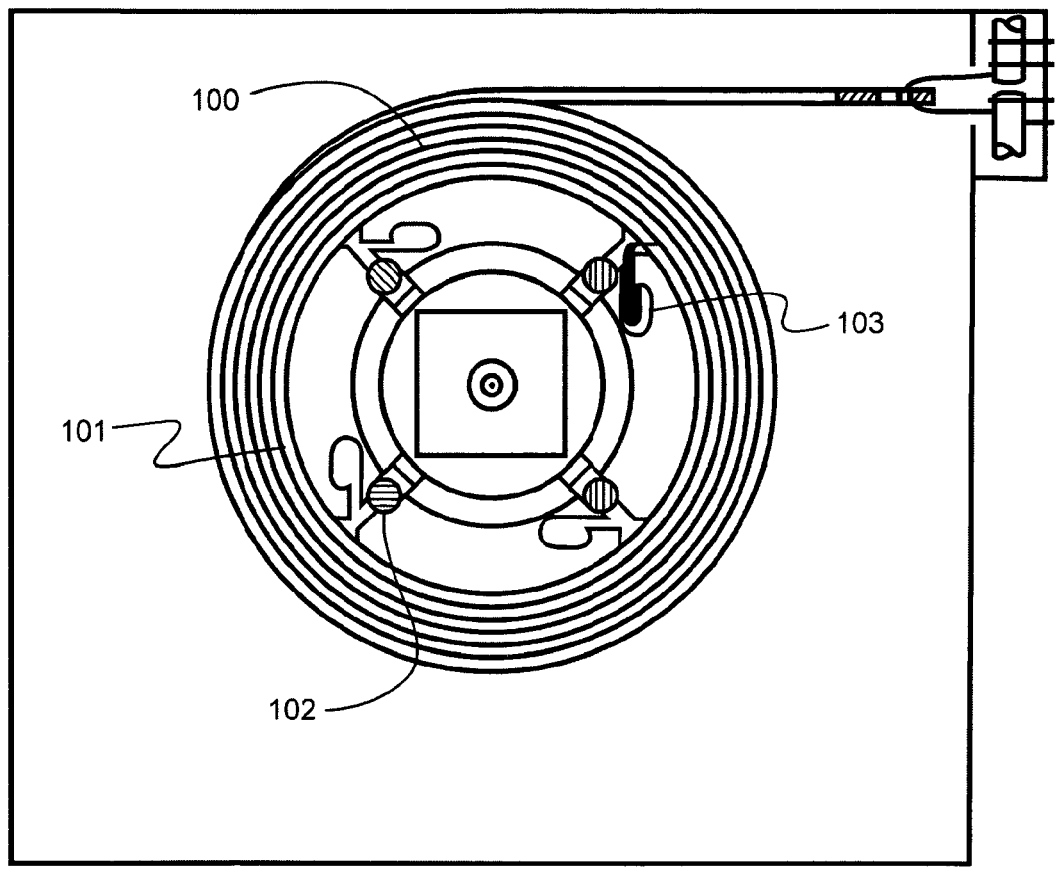
FIGS. 7A-B are a partial top view layout and cross-section of a release device illustrating anti-rotation pins according to some embodiments of the present invention.
Figure 7B:
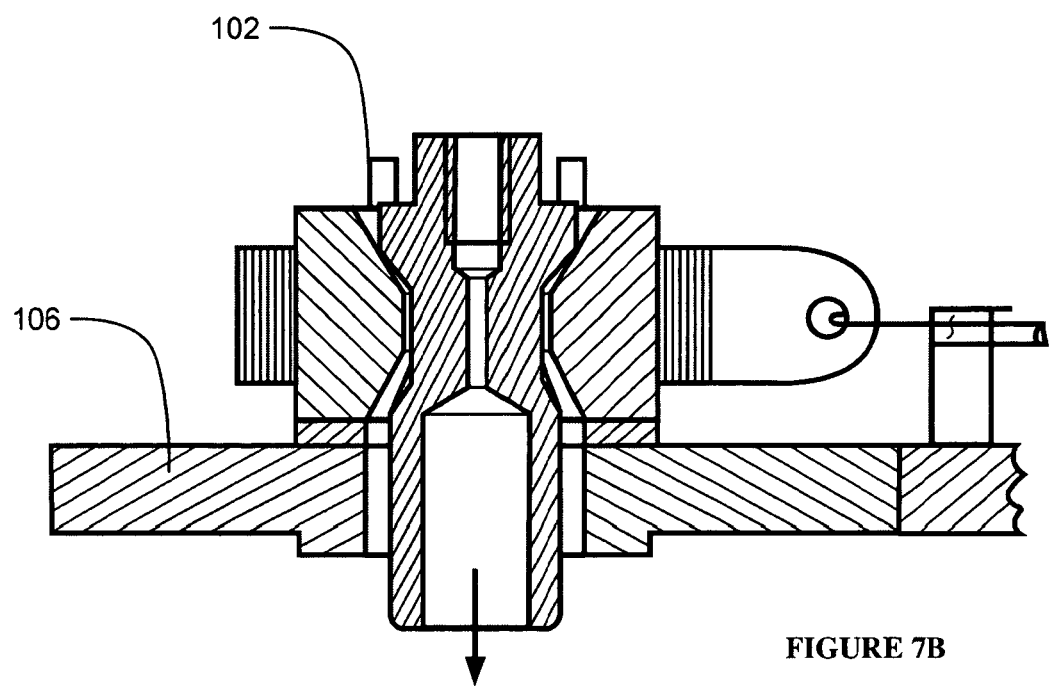

In practice, the tape may be placed under tension by winding the tape around the spool with the bore in a horizontal position and the tape extended and under load. In some embodiments of the present invention, as seen in FIGS. 7A-B, a feature may be added to prevent rotation of the spool segments while under the torsional load that may be placed upon them by the wound tape 107. The spool 100 is seen made up of four segments 101 in this embodiment. Anti-rotational pins 102 are located between the segments 101 and are affixed to the base plate 106 of the apparatus. The pins 102 are adapted to prevent rotation of the segments 101 yet do not interfere with the outward motion of the segments upon their release.

The tape may be anchored on a first end in a slot 103 in a spool segment 101 adapted to receive the tape 107. The second end of the tape may be anchored to a fuse link 105, which may be attached to an insulator which is secured to the base plate of the housing in some embodiments.

Figure 8:
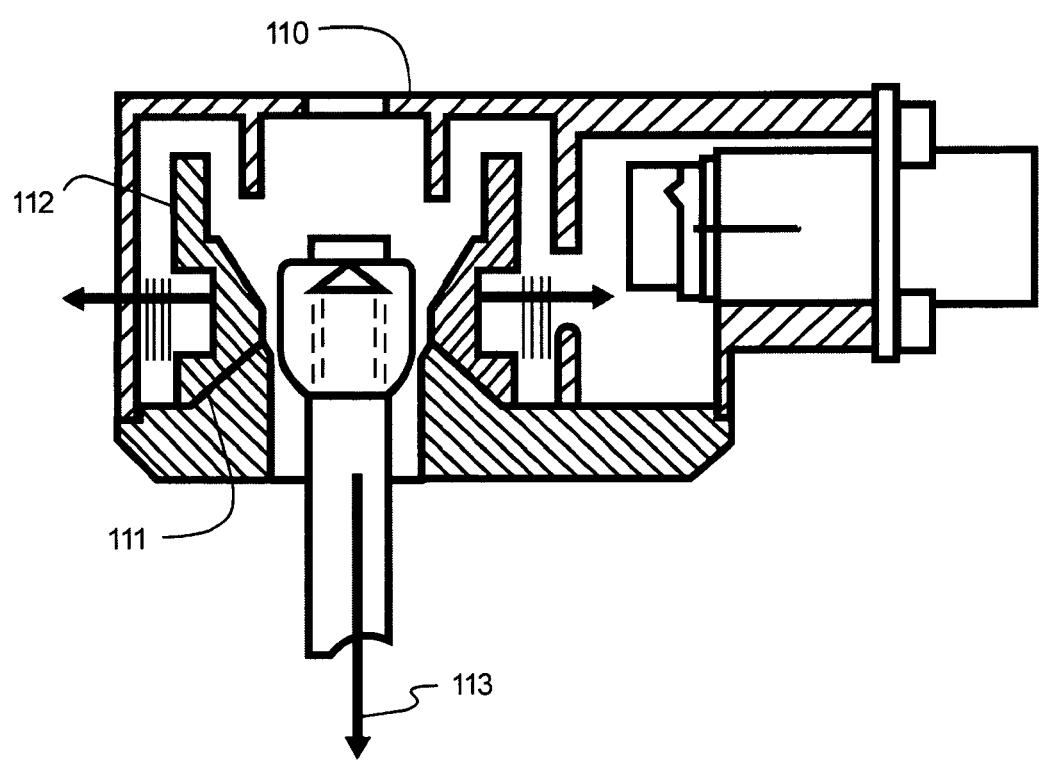
FIG. 8 is a cutaway side view showing an inclined sliding surface according to some embodiments of the present invention.

In some embodiments of the present invention, as seen in FIG. 8, the geometry of the bottom of the spool segments, and of the surface upon which they slide during release, are altered in order to facilitate the release. The release apparatus 110 may have a spool whose segments 112 have an inclined bottom surface 111. An advantage of this inclined surface is that the frictional component along the surface is lower than would be experienced with a perpendicular sliding surface, such as seen in FIG. 5B. Also, the force 113 in the rod being released has a component along the incline, which facilitates the outward motion of the spool segments necessary for release.

Figure 9A:
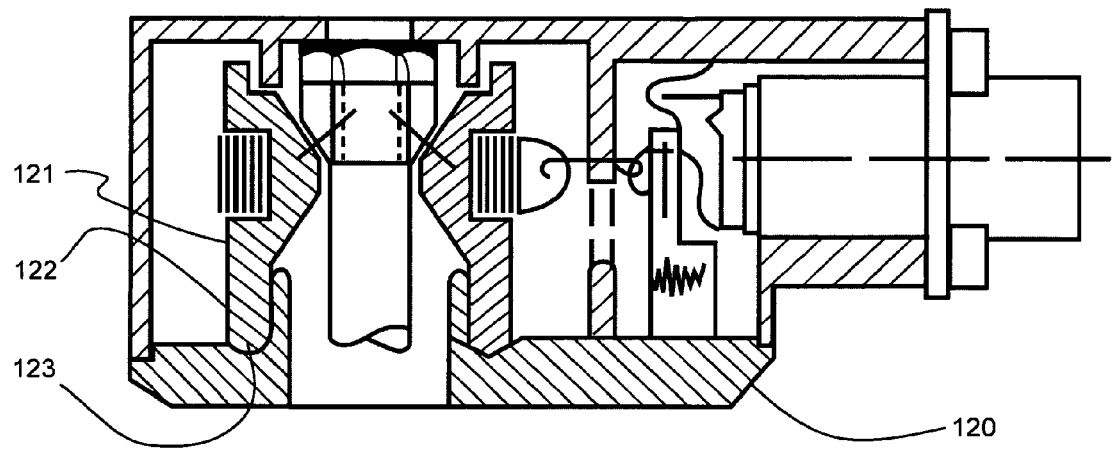
FIGS. 9A-B are cutaway side views showing pivoting bases for the spool segments according to some embodiments of the present invention.
Figure 9B:
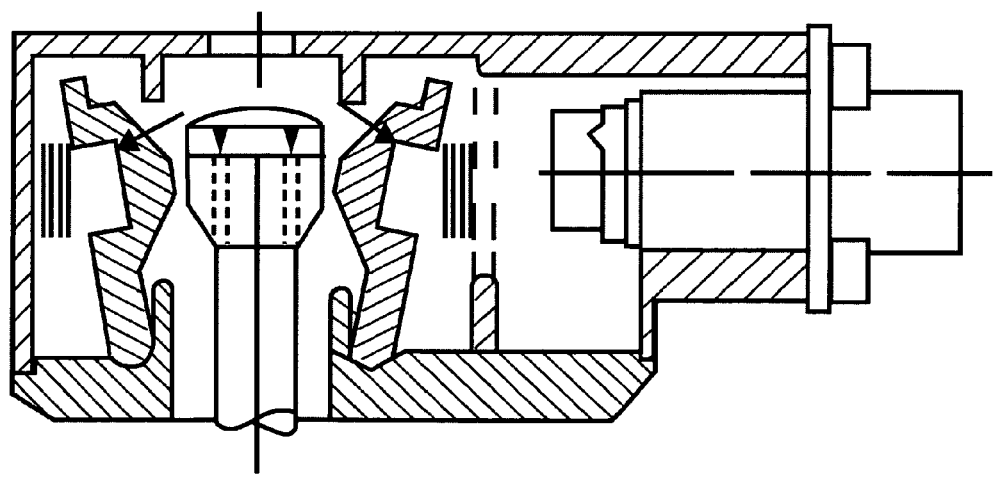

In some embodiments of the present invention, as seen in FIGS. 9A and 9B, another geometry of the bottom of the spool segments is used. As seen, the release apparatus 120 uses a pivoting motion as opposed to a sliding motion. The spool segments 121 may have a rounded bottom 122 which is adapted to pivot within a slot 123 upon release of the tension device constraining the spool. In some embodiments, the bottom of the spool segments may be circular as viewed from the top, in accord with the external periphery of the segments in the area where the tension device is wound. In some embodiments, the bottom of the spool segments may be linear, such that the pivot lies in a linear slot. In some embodiments, the spool segments may come to a rounded point.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A release apparatus for controlling the deployment of a device by restraining or releasing a first member under tension in a first direction, which respectively prevents or allows the deployment of the device, the release apparatus comprising:
    a release device;
    a plurality of spool segments, said spool segments adapted to restrain said first member along said first direction while said plurality of spool segments are in a first constrained position; and
    a restraining tape wound around said plurality of spool segments, wherein:
        said restraining tape has a width in a direction parallel to the first direction that is greater than a thickness in a direction perpendicular to the first direction,
        said restraining tape is wound around said plurality of spool segments such that a portion of the restraining tape contacts the spool segments and such that the restraining tape overlaps itself multiple times when viewed from a direction perpendicular to the first direction,
        said restraining tape restrains the plurality of spool segments in the first constrained position,
        said restraining tape at least partially unwinds from said plurality of spool segments upon actuation of said release device, thereby releasing said first member, and
        said restraining tape encircles said spool segments by more than 360 degrees even after releasing said first member.

2. The release apparatus of claim 1, wherein a second end of said restraining tape is attached to one spool segment of said plurality of spool segments.

3. The release apparatus of claim 1, wherein a first end of said restraining tape is releasably attached to a first portion of said restraining tape, and wherein said release device, upon actuation, causes the release of said first end of said restraining tape from said first portion of said restraining tape.

4. The release apparatus of claim 1, further comprising a housing, and wherein a first end of said restraining tape is releasably attached to said housing.

5. The release apparatus of claim 1, wherein said release device comprises a pivoting arm, wherein a first end of said pivoting arm is releasably attached to a first end of said restraining tape, and wherein a second end of said pivoting arm is releasably attached to an electrically actuated fuse.

6. The release apparatus of claim 1, wherein said release apparatus further comprises a housing, and wherein said spool segments contact said housing along a contact surface, said contact surface perpendicular to said first direction.

7. The release apparatus of claim 1, wherein said release apparatus further comprises a housing, and wherein said spool segments contact said housing along a pivoting contact surface, and wherein said spool segments are adapted to pivot radially outward from said pivoting contact surface upon release from said first constrained position when said first member is under tension along said first direction.

8. The release apparatus of claim 1, wherein said release apparatus further comprises a housing, and wherein said spool segments contact said housing along a pivoting contact surface, and wherein said spool segments are adapted to pivot radially outward from said pivoting contact surface upon release from said first constrained position when said first member is under tension along said first direction.

9. A release apparatus for controlling the deployment of a device by restraining or releasing a first member under tension which respectively prevents or allows the deployment of the device, the apparatus comprising:
   a release device;
   a segmented spool portion, said segmented spool portion including a plurality of spool segments adapted to restrain said first member along a first direction while the spool segments are in a first constrained position; and
   a restraining tape wound around said plurality of spool segments, wherein:
      said restraining tape has a width in a direction parallel to the first direction that is greater than a thickness in a direction perpendicular to the first direction,
      said segmented spool portion consists of three of more spool segments, and
      wherein:
         said restraining tape is wound around said plurality of spool segments such that a portion of the restraining tape contacts the spool segments and such that the restraining tape overlaps itself multiple times when viewed from a direction perpendicular to the first direction,
         said restraining tape restrains the plurality of spool segments in the first constrained position
         said restraining tape at least partially unwinds from said plurality of spool segments upon actuation of said release device, thereby releasing said first member, and
         said restraining tape encircles said spool segments by more than 360 degrees even after releasing said first member.

10. The release apparatus of claim 9, further comprising:
   a housing; and
   one or more anti-rotation pins, said anti-rotation pins affixed to said housing and positioned between said plurality of spool segments, said anti-rotation pins adapted to restrict rotational motion of said plurality of spool segments relative to said housing.

11. The release apparatus of claim 9, wherein a second end of said restraining tape is attached to one of the spool segments.

12. The release apparatus of claim 9, wherein a first end of said restraining tape is releasably attached to a first portion of said restraining tape, and wherein said release device, upon actuation, releases said first end of said restraining tape from said first portion of said restraining tape.

* * * * *